United States Patent
Venkataramanan et al.

(10) Patent No.: US 11,774,622 B2
(45) Date of Patent: Oct. 3, 2023

(54) SYSTEM AND METHOD FOR REDUCING A FEASIBLE REGION OF SOLUTIONS IN A RELATIVE PERMEABILITY AND CAPILLARY PRESSURE CURVE

(71) Applicant: SCHLUMBERGER TECHNOLOGY CORPORATION, Sugar Land, TX (US)

(72) Inventors: Lalitha Venkataramanan, Lexington, MA (US); Lin Liang, Belmont, MA (US); Vasileios-Marios Gkortsas, Boston, MA (US); Khaled Hadj-Sassi, Doha (QA); Albina Mutina, Sugar Land, TX (US); Tarek Habashy, Burlington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 71 days.

(21) Appl. No.: 16/761,471

(22) PCT Filed: Nov. 6, 2018

(86) PCT No.: PCT/US2018/059406
§ 371 (c)(1),
(2) Date: May 4, 2020

(87) PCT Pub. No.: WO2019/090316
PCT Pub. Date: May 9, 2019

(65) Prior Publication Data
US 2021/0396904 A1    Dec. 23, 2021

Related U.S. Application Data

(60) Provisional application No. 62/582,051, filed on Nov. 6, 2017.

(51) Int. Cl.
G01V 3/32 (2006.01)
G01V 3/40 (2006.01)

(52) U.S. Cl.
CPC . *G01V 3/32* (2013.01); *G01V 3/40* (2013.01)

(58) Field of Classification Search
CPC ................................ G01V 3/32; G01V 3/40
See application file for complete search history.

(56) References Cited

U.S. PATENT DOCUMENTS 4,541,275 A * 9/1985 Kerzner .................. E21B 47/00
73/152
5,497,321 A * 3/1996 Ramakrishnan ........ G06F 19/00
364/422

(Continued)

FOREIGN PATENT DOCUMENTS

WO    2018075019 A1    4/2018

OTHER PUBLICATIONS

Lin Liang et at, Estimating In-Situ Relative Permeability and Capillary Pressure From Multiphysics Wireline Measurements, Jun. 2-6, 2018, the Society of Petrophysicists and Well Log Analysts (SPWLA), London, UK. (Year: 2018).*

(Continued)

*Primary Examiner* — Son T Le
*Assistant Examiner* — Lal C Mang

(57) ABSTRACT

A method, computer program product, and computing system for receiving downhole logging data for a porous media. A pore size distribution index may be estimated based upon, at least in part, nuclear magnetic resonance data (NMR) from the downhole logging data of the porous media. A relative permeability and capillary pressure curve may be generated with a feasible region of solutions based upon, at least in part, the pore size distribution index.

20 Claims, 14 Drawing Sheets

(56) References Cited

U.S. PATENT DOCUMENTS

| | | | | |
|---|---|---|---|---|
| 2006/0287201 | A1* | 12/2006 | Georgi | C09K 8/14 507/100 |
| 2009/0255669 | A1 | 10/2009 | Ayan et al. | |
| 2010/0185393 | A1* | 7/2010 | Liang | G01V 3/38 702/7 |
| 2012/0065888 | A1* | 3/2012 | Wu | G06F 19/00 702/8 |
| 2014/0107928 | A1* | 4/2014 | Roy | G01V 3/18 702/7 |
| 2014/0136112 | A1* | 5/2014 | Al-Shawaf | E21B 47/00 702/6 |
| 2017/0059467 | A1* | 3/2017 | DiCarlo | G01N 15/082 |

OTHER PUBLICATIONS

M. Rashaid et al, Application of a New Methodology for In-Situ Evaluation of Relative Permeability and Capillary Pressure in the Ahmadi Field of Greater Burgan, Kuwait, Mar. 6-9, 2017, Society of Petroleum Engineers (SPE), Manama, Kingdom of Bahrain. (Year: 2017).*

Liang et al., "Estimating petrophysical parameters and average mudfiltrate invasion rates using joint inversion of induction logging and pressure transient data", Geophysics, Mar. 2011, vol. 76, issue 2, pp. E21-E34.

Liang et al., "In-Situ estimation of relative permeability and capillary pressure from the joint inversion of array resistivity and formation test data", Oct. 9-11, 2017, SPE-187193-MS, Society of Petroleum Engineers, 18 pages.

Rashaid et al., "Application of a new methodology for in-situ evaluation of relative permeability and capillary pressure in the Ahmadi Field of Greater Burgan, Kuwait", Mar. 6-9, 2017, SPE-183868-MS, Society of Petroleum Engineers, 18 pages.

Cig et al., "Inversion of wireline formation tester data to estimate in-situ relative permeability and capillary pressure", Presented at the Abu Dhabi International Petroleum Exhibition and Conference, Society of Petroleum Engineers, SPE-177451-MS, 2015, 17 pages.

Alpak et al., "Simultaneous estimation of in-situ multiphase petrophysical properties of rock formations from wireline formation tester and induction logging measurements" Proceedings of SPE Annual Technical Conference and Exhibition, SPE 90960, Sep. 26-29, 2004, 18 pages.

Ramakrishnan and Wilkinson, "Water cut and fractional flow logs from array-induction measurements", SPE Reservoir Evaluation & Engineering, vol. 2, No. 1, Feb. 1999, pp. 85-94.

Abdallah et al., "Fundamentals of wettability", Oilfield Review, Summer 2007, pp. 44-61.

Goda and Behrenbuch, "Using a modified Brooks Corey model to study oil-water relative permeability for diverse pore structures",SPE International, SPE-88538, Oct. 18-20, 2004, 14 pages.

Brooks and Corey, "Hydraulic Properties of Porous Media", Hydrology Papers, No. 3, Colorado State U., Fort Collins, Colorado, 1964, 37 pages.

Volokitin et al., "Constructing capillary pressure curves from NMR log data in the presence of hydrocarbons", SPWLA 40th Annual Logging Symposium, May 30-Jun. 3, 1999, 10 pages.

Altunbay et al., "Capillary pressure data from NMR logs and its implications on field economics", Society of Petroleum Engineers, SPE 71703, Sep. 2001, 10 pages.

Venkataramanan et al., "Experimental study of the effects of wettability and fluid saturations on Nuclear Magnetic Resonance and Dielectric measurements in limestone", Petrophysics, vol. 55, No. 6, Dec. 2014, pp. 572-586.

Venkataramanan et al., "A New Method to Estimate Cementation and Saturation Exponents from Dielectric Dispersion Data", Society of Petroleum Engineers, SPE-181451, 2016, 19 pages.

Tanino and Blunt, "Capillary trapping in sandstones and carbonates: dependence on pore structure", Water Resources Research, vol. 48, 2012, 13 pages.

Search Report and Written Opinion of International Patent Application No. PCT/US2018/059406 dated Jan. 16, 2019; 10 pages.

International Preliminary Report on Patentability of International Patent Application No. PCT/US2018/059406 dated May 22, 2020; 9 pages.

* cited by examiner

400

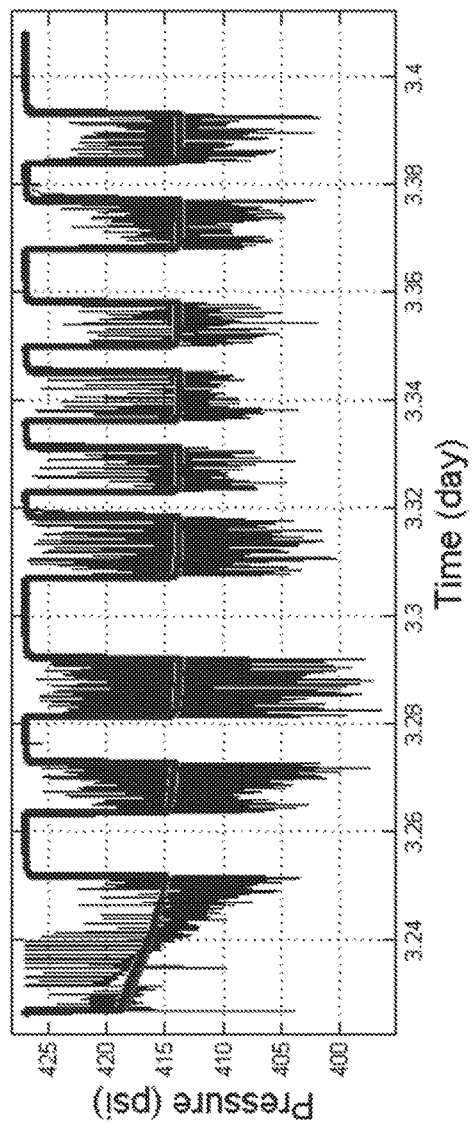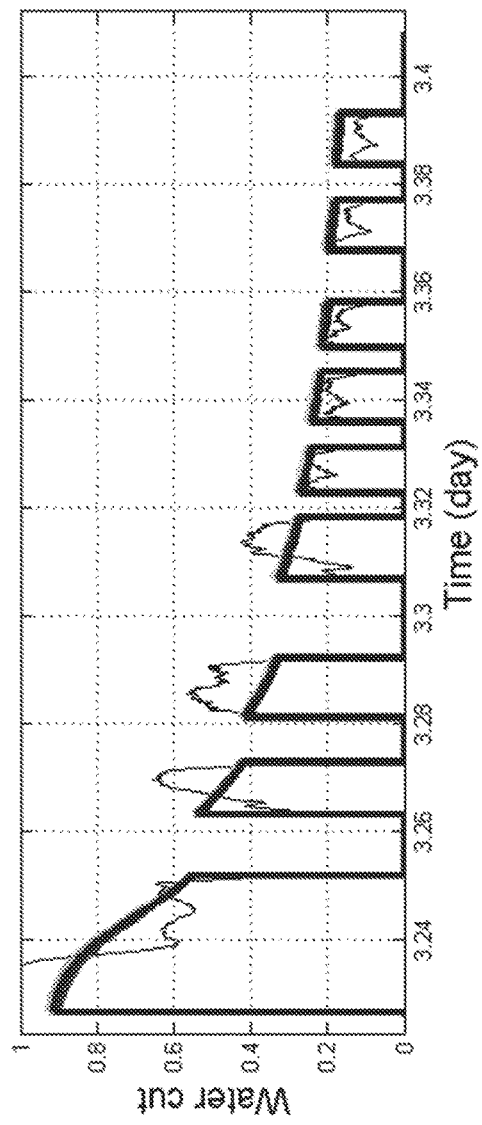
FIG. 5A
FIG. 5B

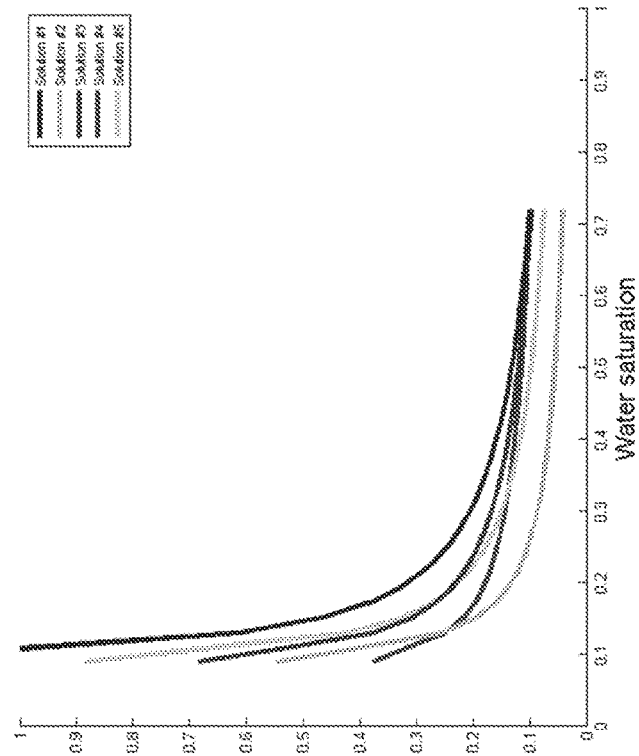
FIG. 6A
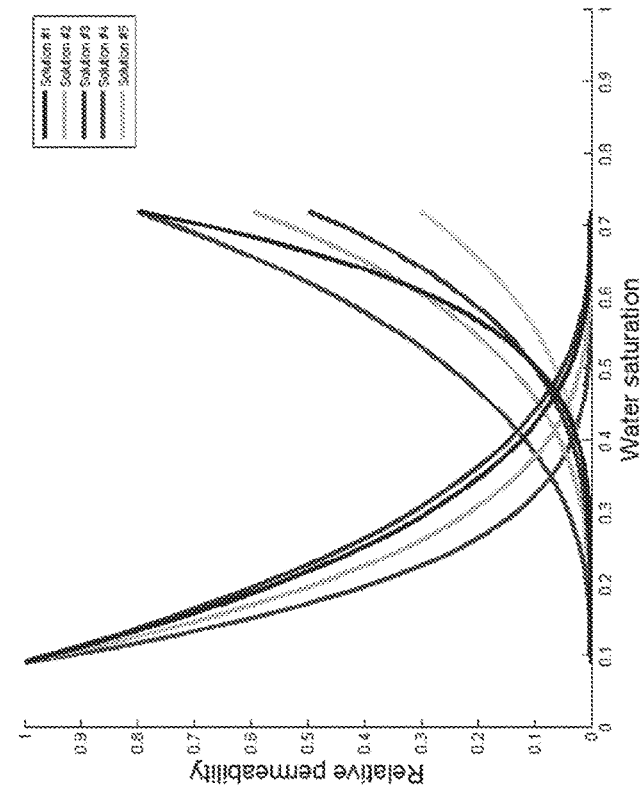
FIG. 6B
FIG. 6C

700

1200

SYSTEM AND METHOD FOR REDUCING A FEASIBLE REGION OF SOLUTIONS IN A RELATIVE PERMEABILITY AND CAPILLARY PRESSURE CURVE

RELATED CASES

This application claims the benefit of U.S. Provisional Application No. 62/582,051 filed on Nov. 6, 2017, entitled SYSTEM AND METHOD FOR REDUCING A FEASIBLE REGION OF SOLUTIONS IN A RELATIVE PERMEABILITY AND CAPILLARY PRESSURE CURVE, the entire contents of which is incorporated herein by reference in its entirety.

BACKGROUND

Information about relative permeability and capillary pressure (Kr-Pc) are key inputs to reservoir modeling, field development planning, and may help predict fluid production from reservoir and aid in decisions about well completions. For example, reservoir engineers use relative permeability and capillary pressure relationships for estimating the amount of oil and gas in a reservoir and for predicting the capacity for flow of oil, water, and gas throughout the life of the reservoir. Information about Kr-Pc is usually obtained on a few cores using special core analysis (SCAL) techniques in the laboratory. These measurements are normally performed on small cores (typically between 1-3 inches) and require fluid saturation changes obtained by several drainage/imbibition cycles which are time-consuming. They also require special equipment to handle fluids and cores at reservoir temperatures and pressure. Measurements and interpretation from these cores are scaled up to a reservoir model, which is a challenging task.

SUMMARY OF DISCLOSURE

In some embodiments, a computer-implemented method is executed on a computing device and may include but is not limited to receiving downhole logging data for a porous media. A pore size distribution index may be estimated based upon, at least in part, nuclear magnetic resonance data (NMR) from the downhole logging data of the porous media. A relative permeability and capillary pressure curve may be generated with a feasible region of solutions based upon, at least in part, the pore size distribution index.

One or more of the following example features may be included. Estimating the pore size distribution index may include estimating the pore size distribution index on one or more of a fully-saturated and partially-saturated porous media. Generating the relative permeability and capillary pressure curve may include defining one or more of an upper bound on an oil relative permeability of the relative permeability and capillary pressure curve and a lower bound on a water relative permeability of the relative permeability and capillary pressure curve based upon, at least in part, a modified Brooks-Corey model and reducing the feasible region of solutions of the relative permeability and capillary pressure curve based upon, at least in part, one or more of the upper bound on an oil relative permeability and the lower bound on a water relative permeability. Log NMR data may be integrated with flow-line NMR to estimate wettability. One or more Corey exponents for a curvature of one or more of an oil relative permeability curve and a water relative permeability curve may be estimated based upon, at least in part, the wettability estimate. The feasible region of solutions of the relative permeability and capillary pressure curve may be reduced based upon, at least in part, the one or more Corey exponents. Relative permeability hysteresis may be estimated from one or more of NMR and mercury porosimetry core data. The feasible region of solutions of the relative permeability and capillary pressure curve may be reduced based upon, at least in part, the relative permeability hysteresis.

In another example implementation, a computer program product residing on a non-transitory computer readable medium having a plurality of instructions stored thereon which, when executed by a processor, cause the processor to perform operations that may include but are not limited to, receiving downhole logging data for a porous media. A pore size distribution index may be estimated based upon, at least in part, nuclear magnetic resonance data (NMR) from the downhole logging data of the porous media. A relative permeability and capillary pressure curve may be generated with a feasible region of solutions based upon, at least in part, the pore size distribution index.

One or more of the following example features may be included. Estimating the pore size distribution index may include estimating the pore size distribution index on one or more of a fully-saturated and partially-saturated porous media. Generating the relative permeability and capillary pressure curve may include defining one or more of an upper bound on an oil relative permeability of the relative permeability and capillary pressure curve and a lower bound on a water relative permeability of the relative permeability and capillary pressure curve based upon, at least in part, a modified Brooks-Corey model and reducing the feasible region of solutions of the relative permeability and capillary pressure curve based upon, at least in part, one or more of the upper bound on an oil relative permeability and the lower bound on a water relative permeability. Log NMR data may be integrated with flow-line NMR to estimate wettability. One or more Corey exponents for a curvature of one or more of an oil relative permeability curve and a water relative permeability curve may be estimated based upon, at least in part, the wettability estimate. The feasible region of solutions of the relative permeability and capillary pressure curve may be reduced based upon, at least in part, the one or more Corey exponents. Relative permeability hysteresis may be estimated from one or more of NMR and mercury porosimetry core data. The feasible region of solutions of the relative permeability and capillary pressure curve may be reduced based upon, at least in part, the relative permeability hysteresis.

In yet another example implementation, a computing system may include one or more processors and one or more memories, wherein the computing system is configured to perform operations that may include but are not limited to downhole logging data for a porous media. A pore size distribution index may be estimated based upon, at least in part, nuclear magnetic resonance data (NMR) from the downhole logging data of the porous media. A relative permeability and capillary pressure curve may be generated with a feasible region of solutions based upon, at least in part, the pore size distribution index.

One or more of the following example features may be included. Estimating the pore size distribution index may include estimating the pore size distribution index on one or more of a fully-saturated and partially-saturated porous media. Generating the relative permeability and capillary pressure curve may include defining one or more of an upper bound on an oil relative permeability of the relative permeability and capillary pressure curve and a lower bound on a water relative permeability of the relative permeability and capillary pressure curve based upon, at least in part, a modified Brooks-Corey model and reducing the feasible region of solutions of the relative permeability and capillary pressure curve based upon, at least in part, one or more of the upper bound on an oil relative permeability and the lower bound on a water relative permeability. Log NMR data may be integrated with flow-line NMR to estimate wettability. One or more Corey exponents for a curvature of one or more of an oil relative permeability curve and a water relative permeability curve may be estimated based upon, at least in part, the wettability estimate. The feasible region of solutions of the relative permeability and capillary pressure curve may be reduced based upon, at least in part, the one or more Corey exponents. Relative permeability hysteresis may be estimated from one or more of NMR and mercury porosimetry core data. The feasible region of solutions of the relative permeability and capillary pressure curve may be reduced based upon, at least in part, the relative permeability hysteresis.

This summary is provided to introduce a selection of concepts that are further described below in the detailed description. This summary is not intended to identify essential features of the claimed subject matter, nor is it intended to be used as an aid in limiting the scope of the claimed subject matter.

BRIEF DESCRIPTION OF THE DRAWINGS

Embodiments of the present disclosure are described with reference to the following figures.

FIGS. 5A-5B illustrate simulated water cut and pressure data in accordance with embodiments of various techniques described herein;

FIG. 6A illustrates different solution sets of parameters that fit the data equally well in accordance with embodiments of various techniques described herein;

FIGS. 6B-6C illustrates resulting Kr-Pc curves from the simulated data of FIGS. 5A-5B and FIG. 6A in accordance with embodiments of various techniques described herein;

Like reference symbols in the various drawings may indicate like elements.

DETAILED DESCRIPTION

Figure 1:
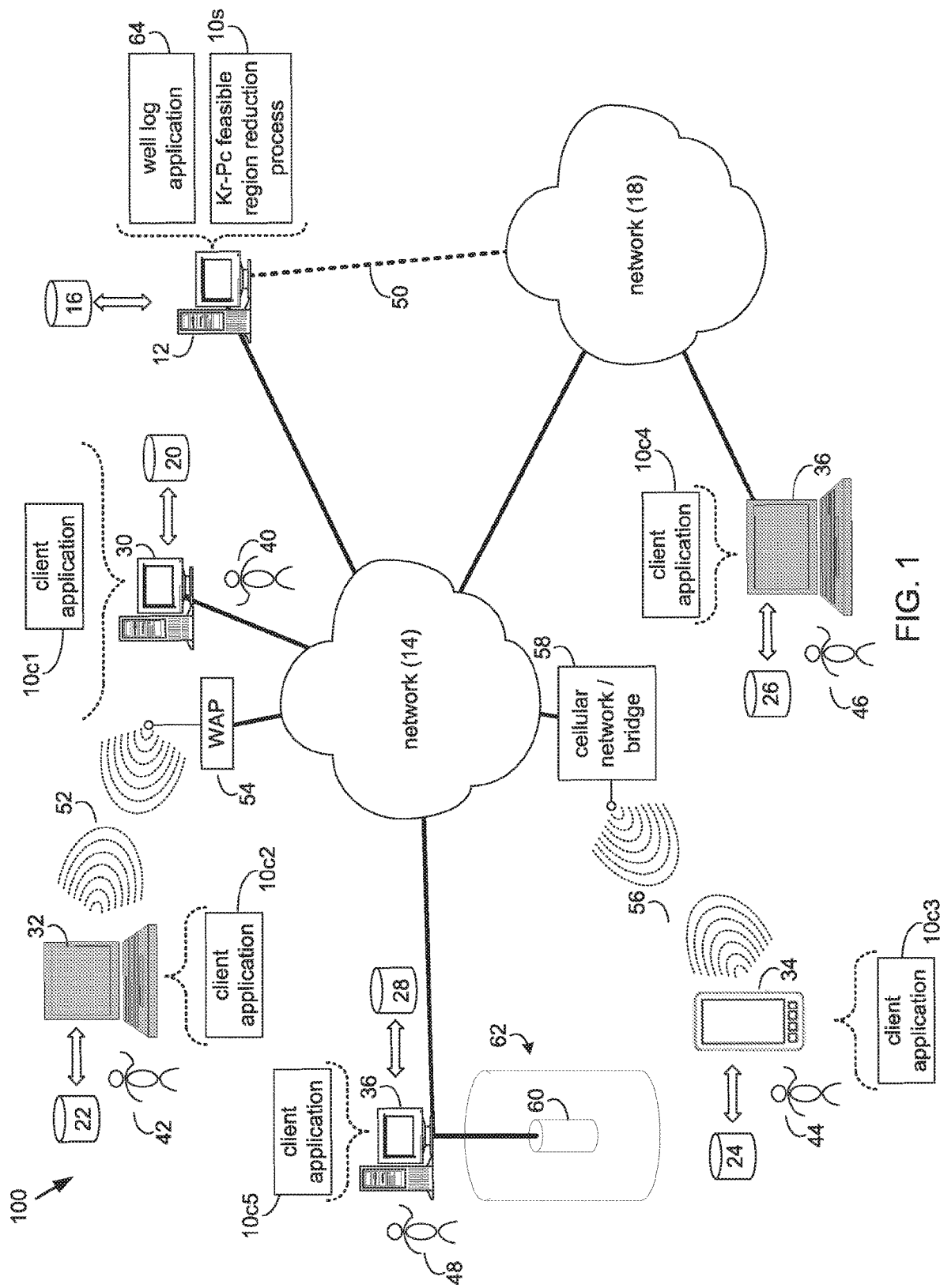
FIG. 1 is a diagrammatic view of a distributed computing network including a computing device that executes a Kr-Pc feasible region reduction process according to an implementation of the present disclosure.
Figure 2:
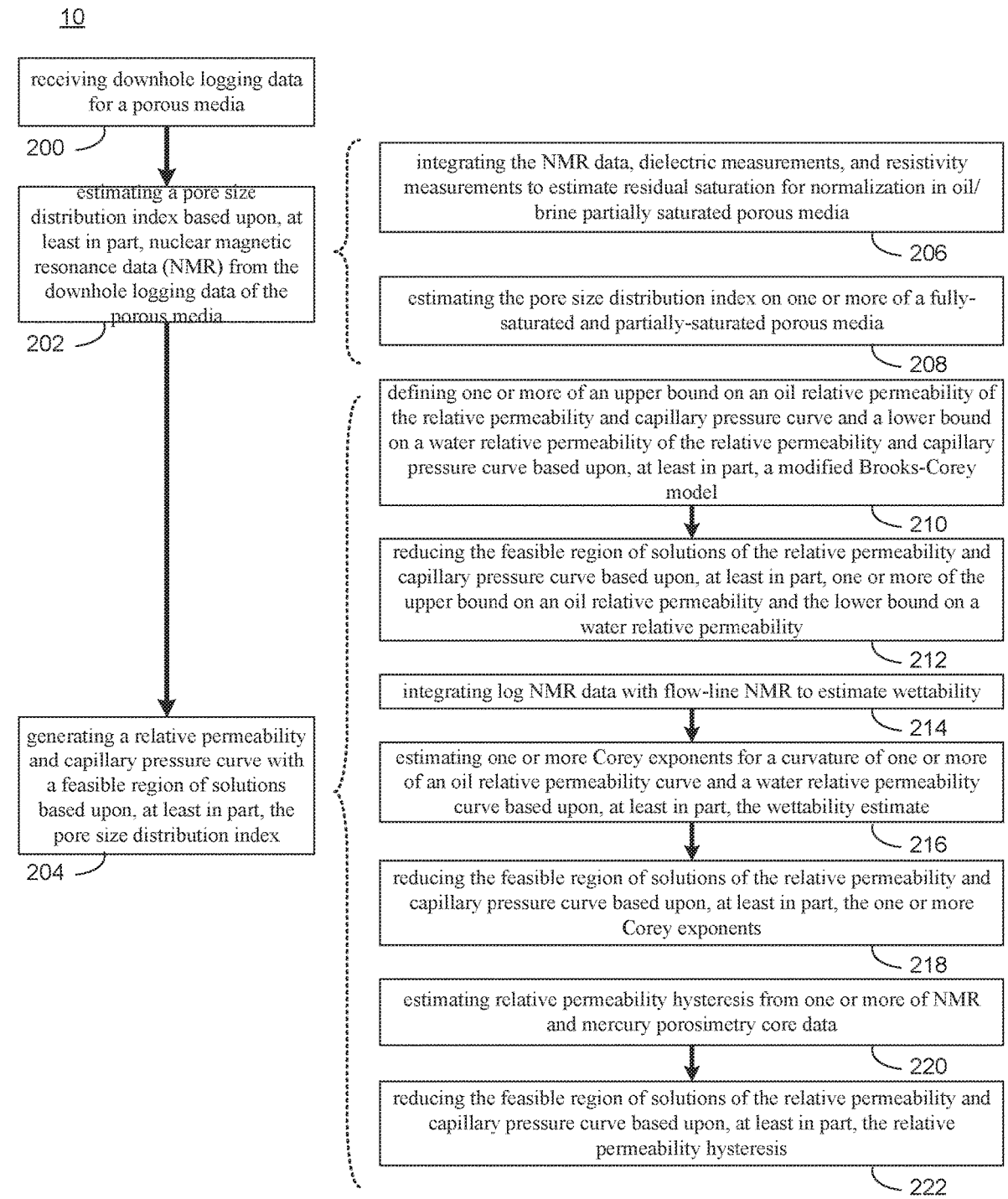
FIG. 2 is a flowchart of Kr-Pc feasible region reduction process according to an implementation of the present disclosure.

The discussion below is directed to certain implementations and/or embodiments. It is to be understood that the discussion below is only for the purpose of enabling a person with ordinary skill in the art to make and use any subject matter defined now or later by the patent "claims" found in any issued patent herein.

It is specifically intended that the claimed combinations of features not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered a same object or step.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Referring to FIG. 1, there is shown Kr-Pc feasible region reduction process 10. For the following discussion, it is intended to be understood that Kr-Pc feasible region reduction process 10 may be implemented in a variety of ways. For example, Kr-Pc feasible region reduction process 10 may be implemented as a server-side process, a client-side process, or a server-side/client-side process.

For example, Kr-Pc feasible region reduction process 10 may be implemented as a purely server-side process via Kr-Pc feasible region reduction process 10s. Alternatively, Kr-Pc feasible region reduction process 10 may be implemented as a purely client-side process via one or more of client-side application 10c1, client-side application 10c2, client-side application 10c3, and client-side application 10c4. Alternatively still, Kr-Pc feasible region reduction process 10 may be implemented as a server-side/client-side process via server-side Kr-Pc feasible region reduction process 10s in combination with one or more of client-side application 10c1, client-side application 10c2, client-side application 10c3, client-side application 10c4, and client-side application 10c5. In such an example, at least a portion of the functionality of Kr-Pc feasible region reduction process 10 may be performed by Kr-Pc feasible region reduction process 10s and at least a portion of the functionality of Kr-Pc feasible region reduction process 10 may be performed by one or more of client-side application 10c1, 10c2, 10c3, 10c4, and 10c5.

Accordingly, Kr-Pc feasible region reduction process 10 as used in this disclosure may include any combination of Kr-Pc feasible region reduction process 10s, client-side application 10c1, client-side application 10c2, client-side application 10c3, client-side application 10c4, and client-side application 10c5.

Kr-Pc feasible region reduction process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of Kr-Pc feasible region reduction process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

The instruction sets and subroutines of client-side application 10c1, 10c2, 10c3, 10c4, 10c5 which may be stored on storage devices 20, 22, 24, 26, 28 (respectively) coupled to client electronic devices 30, 32, 34, 36, 38 (respectively), may be executed by one or more processors (not shown) and one or more memory architectures (not shown) incorporated into client electronic devices 30, 32, 34, 36, 38 (respectively). Examples of storage devices 20, 22, 24, 26, 28 may include but are not limited to: hard disk drives; tape drives; optical drives; RAID devices; random access memories (RAM); read-only memories (ROM), and all forms of flash memory storage devices.

Examples of client electronic devices 30, 32, 34, 36, 38 may include, but are not limited to, personal computer 30, 36, laptop computer 32, mobile computing device 34, notebook computer 36, a netbook computer (not shown), a server computer (not shown), a gaming console (not shown), a data-enabled television console (not shown), and a dedicated network device (not shown). Client electronic devices 30, 32, 34, 36, 38 may each execute an operating system.

Users 40, 42, 44, 46, 48 may access Kr-Pc feasible region reduction process 10 directly through network 14 or through secondary network 18. Further, Kr-Pc feasible region reduction process 10 may be accessed through secondary network 18 via link line 50.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 52 established between laptop computer 30 and wireless access point (WAP) 54. Similarly, mobile computing device 32 is shown wirelessly coupled to network 14 via wireless communication channel 56 established between mobile computing device 32 and cellular network/bridge 58, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 52 between laptop computer 30 and WAP 54. Additionally, personal computer 34 is shown directly coupled to network 18 via a hardwired network connection.

In some implementations, a client electronic device (e.g., client electronic device 38) may be electronically coupled to at least one logging device 60 (e.g. wireline, LWD, etc.). As will be discussed in greater detail below, device 60 may be configured to be deployed into, or adjacent, a well (e.g., well 62) or other structure. In some implementations, logging device 60 may generally include a tool run on an electric logging cable that pushes a probe into the formation, which then allows production into a small closed chamber. Logging device 60 may obtain formation pressures at chosen locations in an interval, and, with an accurate quartz gauge, permeability estimates may be obtained. In some implementations, logging device 60 may acquire formation-fluid samples. In some implementations, logging device 60 may include a dielectric scanner configured to measure water volume and rock textural information and/or a resistivity sensor configured to measuring electrical resistivity of rock or sediment.

In some embodiments, Kr-Pc feasible region reduction process 10 may communicate with, interact with, and/or include a component or module of a well log application (e.g., well log application 64). In some embodiments, the well log application may process, store, or otherwise interact with logging data recorded or provided by logging device 60.

In an embodiment, the instruction sets and subroutines of well log application 64 may be stored, e.g., on storage device 16 associated with server computer 12, which executes well log application 64, and/or another suitable storage device. Further, users (e.g., one or more of users 40, 42, 44, 46, 48) may access well log application 64 in order to access well logs and other data received from device 60 or other mechanisms. The users may access well log application 64 via one or more suitable applications, such as client side applications 10c1-10c5 (e.g., which may include a web browser, a client electronic meeting application, or another application) and/or via a different application (not shown). Additionally, while some users are depicted as being connected with server computer 12 (and therefore with electronic well log application 64) via network 14, which may include the Internet, in other embodiments, one or more users may be directed connected to server computer 12 and/or connected with server computer 12 via, e.g., a local area network and/or similar connection.

As generally discussed above, a portion and/or all of the functionality of Kr-Pc feasible region reduction process 10 may be provided by one or more of client side applications 10c1-10c5. For example, in some embodiments Kr-Pc feasible region reduction process 10 (and/or client-side functionality of Kr-Pc feasible region reduction process 10) may be included within and/or interactive with client-side applications 10c1-10c5, which may include client side electronic well log applications, web browsers, or another application. Various additional/alternative configurations may be equally utilized.

In some implementations and as will be discussed in greater detail below, relative permeability and capillary pressure (Kr-Pc) information may be represented in Kr-Pc curves. Kr-Pc curves can play an important role in reservoir modeling and predicting multi-phase fluid flow through porous media such as reservoir rocks. In some implementations of the present disclosure and as will be discussed in greater detail below, formation testing tools coupled with resistivity measurements can provide an estimate of Kr-Pc through multi-physics joint integration. However, computing Kr-Pc curves may generally be an ill-conditioned problem with multiple sets of parameters providing equally good fits to the measured data.

As will be discussed in further detail below and in some implementations of the present disclosure, wireline or LWD (logging while drilling) and NMR (nuclear magnetic resonance) can provide parameters such as a pore size distribution index that can constrain the set of parameters that fit the data, thereby reducing the uncertainty in the set of Kr-Pc solutions. As discussed above, Kr-Pc curves may define a solution space of relative permeability and capillary pressure for estimating the amount of oil and gas in a reservoir and for predicting the capacity for flow of oil, water, and gas throughout the life of the reservoir. However, as discussed above, the size of the solution space of a Kr-Pc curve may be influenced by many parameters or factors, thus making feasible solutions difficult to determine. As will be discussed in greater detail below, by generating a Kr-Pc based upon, at least in part, a pore size distribution index estimated from nuclear magnetic resonance data from the downhole logging data of the porous media, Kr-Pc feasible region reduction process 10 may generate a feasible solution space smaller than the solution space produced for Kr-Pc curves generated by conventional approaches.

In addition, integration with dielectric and/or flow-line NMR can provide information about wettability which can further reduce the set of feasible solutions of Kr-Pc and thereby better condition the problem. For example, by combining dielectric and NMR and resistivity measurements, the saturation endpoints for Kr-Pc curves may be confined. Further, if core mercury (Hg) porosimetry data is available, the size of a feasible solution space may be reduced for hysteresis of both drainage and imbibition relative permeability curves.

Referring also to FIGS. 2-14 and in some implementations, downhole logging data may be received 200 from one or more devices such as those discussed above. A pore size distribution index may be estimated 202 based upon, at least in part, nuclear magnetic resonance data from the downhole logging data of the porous media. A relative permeability and capillary pressure (Kr-Pc) curve may be generated 204 based upon, at least in part, the pore size distribution index.

In some implementations, Kr-Pc feasible region reduction process 10 may receive 200 downhole logging data for a porous media. Well logging may generally include the process of recording various physical, chemical, electrical, or other properties of the rock/fluid mixtures penetrated by drilling a borehole into the earth's crust. Downhole logging data may include a record of nuclear magnetic resonance (NMR) parameters, resistivity data, etc. along the well trajectory. In some embodiments, downhole logging data may be collected or sampled using special devices, which may include, but are not limited to wireline, logging while drilling "LWD", other specialized devices, etc. In some embodiments, once these devices have obtained the necessary information it may be provided to various computing devices such as those shown in FIG. 1.

Downhole logging data or measurements may generally include data and/or measurements collected in or adjacent to a well or borehole. Downhole measurements and analysis have several clear advantages over laboratory study. First, these parameters are obtained under formation conditions and relatively quickly, in comparison to the lab data. Second, the measurements correspond to the well/relevant reservoir scale and therefore circumvent extrapolating properties derived on the inch-scale to properties on meters-scale. As discussed above, information about relative permeability and capillary pressure (Kr-Pc) may be key inputs to reservoir modeling, field development planning, and may help predict fluid production from reservoir and aid in decisions about well completions. For example, reservoir engineers may use relative permeability and capillary pressure relationships for estimating the amount of oil and gas in a reservoir and for predicting the capacity for flow of oil, water, and gas throughout the life of the reservoir. Conventional approaches utilize information about Kr-Pc obtained on a few cores using special core analysis (SCAL) techniques in the laboratory. These measurements are normally performed on small cores (typically between 1-3 inches) and require fluid saturation changes obtained by several drainage/imbibition cycles which are time-consuming. Conventional approaches also suffer from greater inaccuracies because a solution space representative of the relative permeability and capillary pressure relationships for a reservoir may vary widely based on many parameters and scaling a small number of core samples to an entire reservoir may not account for these parameters.

In some implementations and as will be discussed in greater detail below, Kr-Pc feasible region reduction process 10 may use downhole measurements instead of laboratory data to generate the Kr-Pc curves with a reduced number of feasible regions when compared to conventional Kr-Pc curves generated from laboratory data. Additionally, the ability of Kr-Pc feasible region reduction process 10 to utilize downhole logging data of the porous media to generate the Kr-Pc curves may save significant time and resources as the equipment required to physically measure relative permeability and/or capillary pressure in even a small number of cores may be significantly more expensive.

Figure 3:
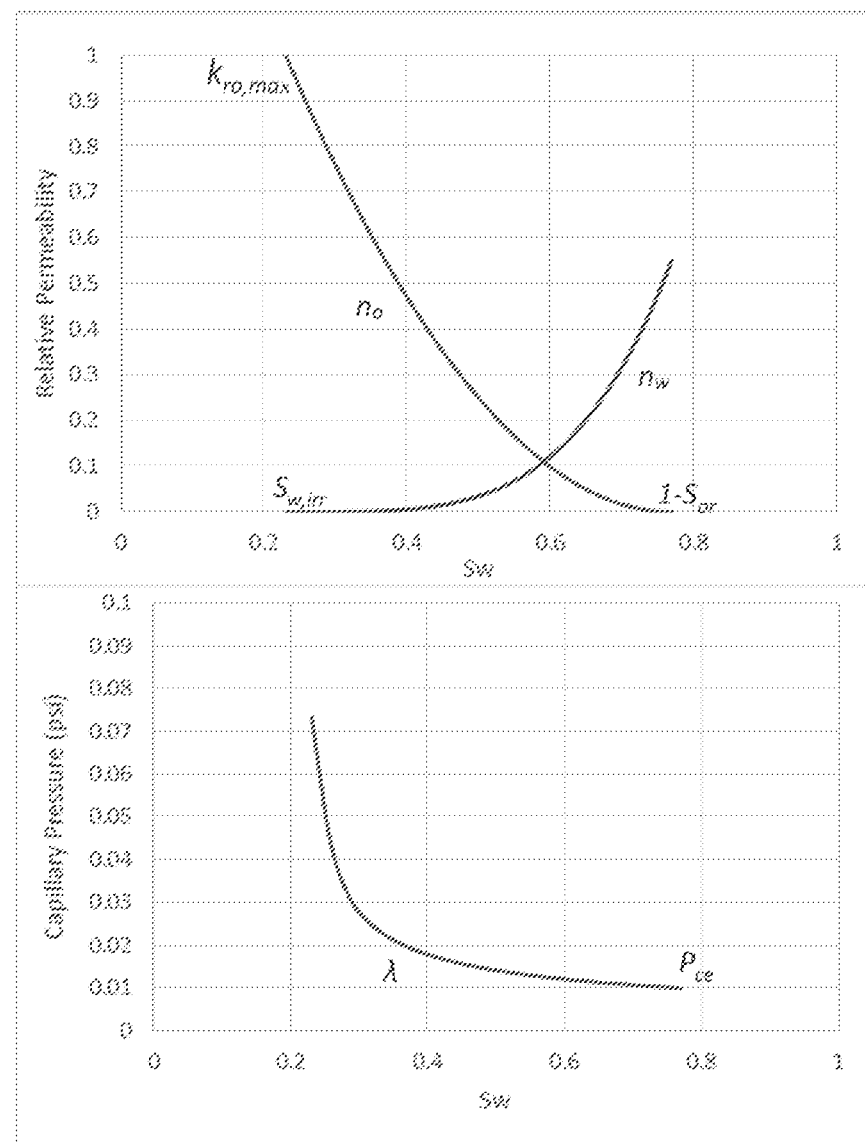
FIG. 3 is a typical Kr-Pc curve in accordance with embodiments of various techniques described herein.

In some implementations, Kr-Pc feasible region reduction process 10 may estimate 202 a pore size distribution index based upon, at least in part, nuclear magnetic resonance data (NMR) from the downhole logging data of the porous media. In some embodiments, estimating 202 the pore size distribution index may include estimating 206 the pore size distribution index on one or more of a fully-saturated and partially-saturated porous media. For example and as shown in FIG. 3, Kr-Pc curves may generally be characterized by several parameters. In the example of FIG. 3, the Kr-Pc curve may be characterized by eight parameters. In some implementations, resistivity/induction and flow measurements may have reduced sensitivity to at least some of these parameters. In some implementations, NMR can help provide some information about these parameters—especially, $n_o$, $n_w$, PSDI (or $\lambda$) and $P_{ce}$, and $S_{w,irr}$. Although there may be several formulations that are used to characterize these curves, some common parameters that most models share may generally include: relative permeability end-points for oil and water ($k_{ro,max}$, $k_{rw,max}$), irreducible oil and water ($S_{or}$, $S_{w,irr}$), curvature of the oil and water relative permeability curves ($n_o$, $n_w$), the capillary entry pressure ($P_{ce}$), and/or pore size distribution index (denoted by PSDI or $\lambda$). These parameters may not be entirely independent of each other and may also depend on a number of underlying petro-physical parameters.

In some implementations, a model for generating Kr-Pc curves may include a modified Brooks-Corey formulation, as described in Equations 1~4 below:

$$S_w^* = \left( \frac{S_w - S_{w,irr}}{1 - S_{w,irr} - S_{or}} \right) \quad (1)$$

$$P_c = P_{ce}(S_w^*)^{-1/\lambda} \quad (2)$$

$$k_{rw} = k_{rw,max}(S_w^*)^{n_w} \quad (3)$$

$$k_{ro} = k_{ro,max}(1 - S_w^*)^{n_o} \quad (4)$$

where $S_w$ may generally define the residual saturation of the wetting phase and $S^*_w$ may generally define the normalized wetting-phase saturation.

Water-based mud invasion into an oil-bearing formation is governed by immiscible two-phase flow, which can be illustrated by Kr-Pc curves. Resistivity measurements are sensitive to the salinity and saturation variation in the near well-bore region. Radial variation of fluid saturation also affects fractional flow and transient pressure data obtained by the formation tester. As will be discussed below, embodiments of Kr-Pc feasible region reduction process 10 may provide a multi-physics based forward modeling and inversion of data from a formation tester and resistivity tool to infer Kr-Pc.

Figure 4:
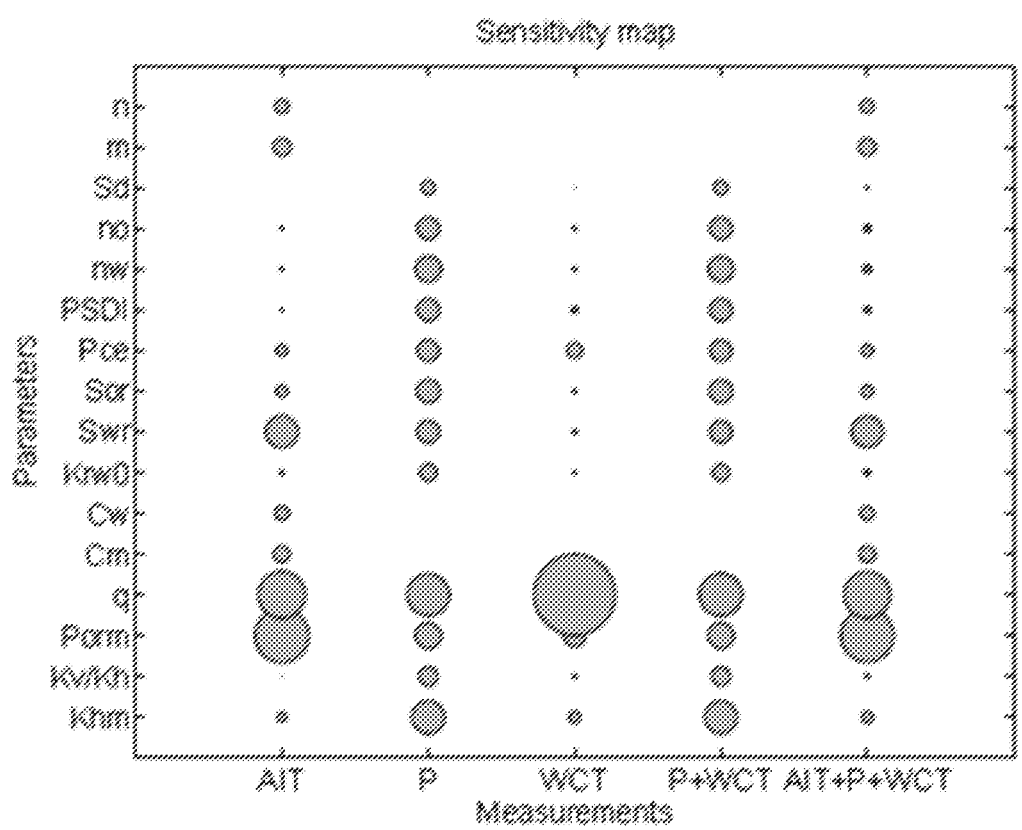
FIG. 4 illustrates sensitivity of parameters to a combination of resistivity/induction (AIT) and formation testing which measure pressure (P) and water cut (WCT) data in accordance with embodiments of various techniques described herein.

A sensitivity plot of mud invasion and Kr-Pc parameters to the measured formation tester data is shown in FIG. 4. Each column of FIG. 4 may correspond to sensitivity of parameters to a specific set of measurements (e.g., a combination of resistivity/induction (AIT) and formation testing which measure pressure (P) and water cut (WCT) data). The size of the bubble is related to the sensitivity of the parameter. The bubble size is normalized in each column separately. The larger the bubble, the greater the sensitivity of the parameter to the set of measurements. For example, it may be noted that in the last column parameters such as the irreducible water saturation, mud-filtrate invasion volume, porosity may be well-computed due to their high sensitivity. Parameters such as PSDI, $n_o$, $n_w$, and $P_{ce}$ may not be as sensitive to the resistivity and formation testing measurements and will therefore not be easily estimated.

This concept of reduced sensitivity is illustrated in FIGS. 5A, 5B, 6A, and 6C. Simulated formation testing measurements of water-cut and pressure transient response are shown in FIGS. 5A-5B. Different sets of parameters may fit the measurement data equally well; some of these solutions are shown in the inset table of FIG. 6A. The resulting Kr-Pc curves from some of these solutions are shown in FIGS. 6B and 6C. It may be observed that there is a large variation in these curves. This may be due to the low sensitivity of the pressure and water-cut data to some of the parameters that help define the Kr-Pc curves. As such, the pressure and water-cut data may not be sensitive enough for some of the parameters that help define the Kr-Pc curves.

Figure 7:
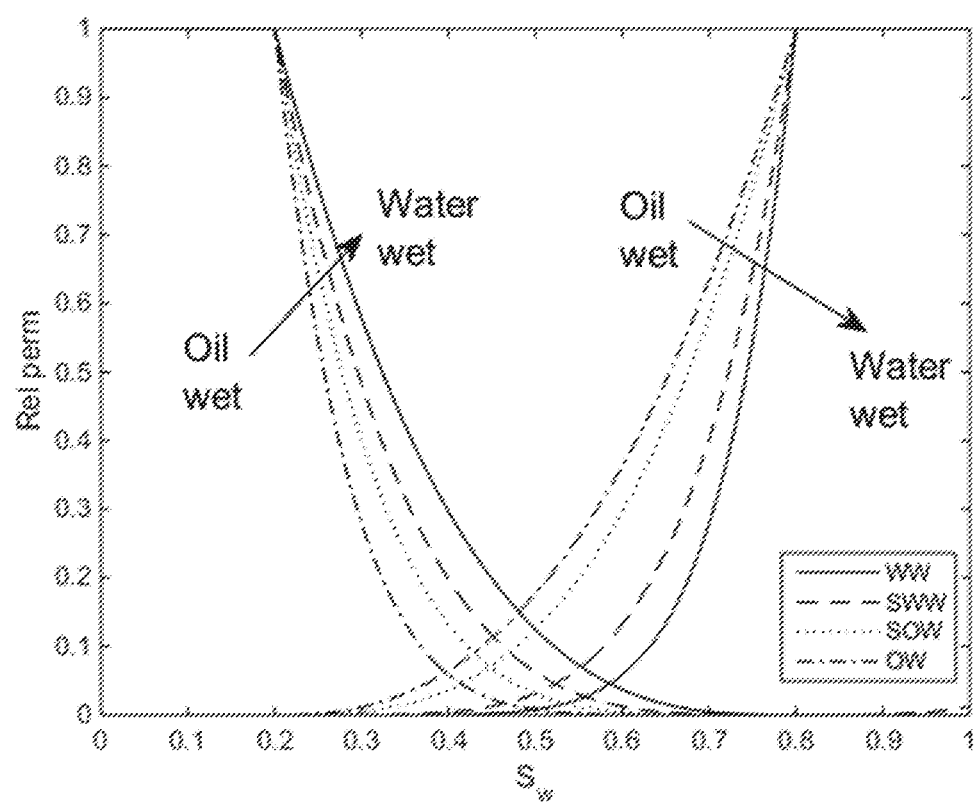
FIG. 7 illustrates the effect of wettability on the shape of the relative permeability curves in accordance with embodiments of various techniques described herein.

Referring also to FIG. 7, wettability may be an important formation parameter that affects relative permeability (Kr) and capillary pressure (Pc). Wettability may generally include the tendency of one fluid to spread on, or adhere to, a solid surface in the presence of other immiscible fluids. For example, wettability may generally refer to the interaction between fluid and solid phases. In a reservoir rock, the liquid phase can be water or oil or gas, and the solid phase may be the rock mineral assemblage. Although there is no direct method to compute Kr-Pc parameters from wettability, generally accepted heuristics are used to choose a set of feasible Kr-Pc curves from a wettability index. For example, a water-wet formation generally has lower ratio of $K_{ro,max}/K_{rw,max}$ in comparison to an oil wet formation. The water-wet formation also generally has higher irreducible water $S_{w,irr}$ and, since oil is often trapped by the surrounding water, it also has a lower irreducible oil $S_{or}$. The shape of the relative permeabilities defined by $n_w$ and $n_o$, may also vary with wettability. For example, the nature of the variation of this shape is shown in FIG. 7. In this illustration, the end-point saturations and maximum relative permeabilities may be fixed. The shape of the curves is defined by $n_w$ and $n_o$, which varies with wettability. A water-wet scenario is characterized by higher $n_w$ and lower $n_o$ in Equations 3-4 where some water stays bound to the surface and oil is thought to be in the middle of larger pores. Thus, it has a higher oil relative permeability curve and a lower water relative permeability curve compared to an oil-wet rock which is characterized by lower $n_w$ and higher $n_o$. On the contrary, an oil-wet rock may be characterized by a lower $n_w$ and higher $n_o$.

In some implementations and as will be discussed in greater detail below, the Kr-Pc curves may be affected by the heterogeneity of the porous medium, $\lambda$, in Equations 1-4. From the Brooks-Corey study of porous media, $\lambda$ can take any positive value greater than zero, being small for media with a wide range of pore sizes and large for media with a relatively uniform pore size as discussed in Brooks, R. H. and A. T. Corey, 1964, *Hydraulic Properties of Porous Media*. Hydrology Papers, No. 3, Colorado State U., Fort Collins, Colo., which is incorporated herein by reference. In these studies, $\lambda$ was found to take values from 1.8 (silty loam) to 8 (glass bead pack). In some implementations, $\lambda$ may be found from mercury porosimetry data on cores. When cores are homogenous, with increasing pressure, there may be almost a sharp change in saturation as mercury goes into many identical pores at the same time. On the other hand, when the cores are heterogeneous, there may be a gradual increase in mercury saturation with increasing pressure. Thus, using Equation 2, the slope of the mercury saturation versus pressure may be used to obtain $\lambda$ in the laboratory.

Figure 8:
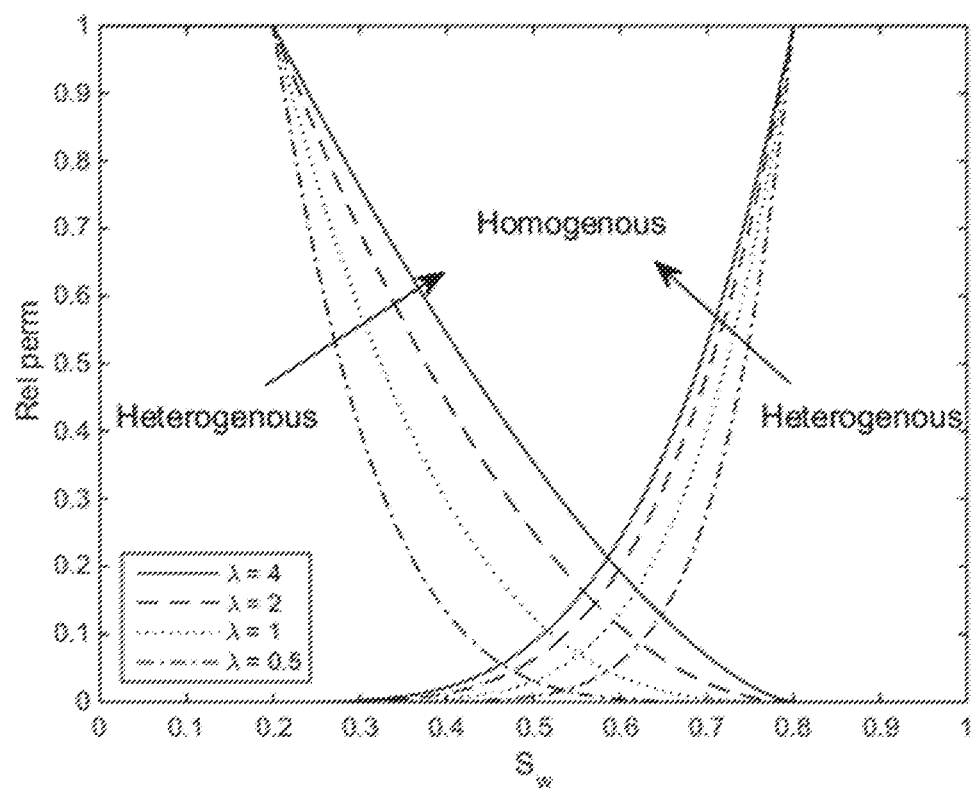
FIG. 8 illustrates the effect of pore size distribution index λ on the shape of the relative permeability curves for a water-wet rock in accordance with embodiments of various techniques described herein.

There are many models that may predict Kr and Pc curves. These models are generally either capillary or network models. For example, the modified Brooks-Corey method for water-wet rocks with $$n_w = 3 + \frac{2}{\lambda} \text{ and } n_o = 1 + \frac{2}{\lambda}$$

may fit the measured experimental brine/oil data reasonably well. For example, the effect of $\lambda$ on relative permeabilities is illustrated in FIG. 8, where, as before, the end-point saturations and maximum relative permeabilities are fixed. The shape of the curves may be defined by $n_w$ and $n_o$ and varies with $\lambda$. A homogenous rock may be characterized by lower $n_w$ and $n_o$ in Equations 3-4, and may have a higher relative permeability compared to a more heterogeneous rock characterized by higher $n_w$ and higher $n_o$. When $\lambda$ is small (heterogenous cores), the water phase tends to be more tortuous and the relative permeability smaller than when $\lambda$ is large (homogenous cores).

Figure 9B:
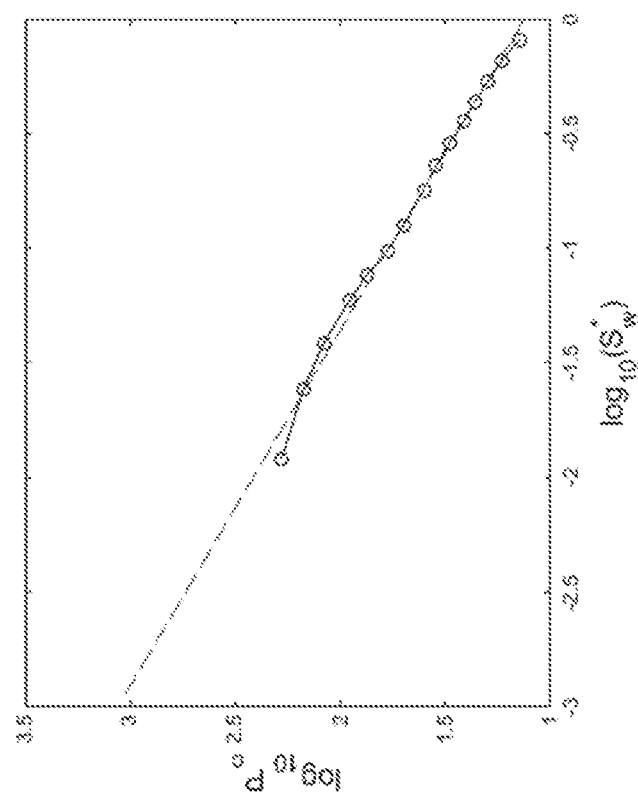
FIG. 9B illustrates the mercury intrusion curve of FIG. 9A plotted on a logarithmic axis.
Figure 9A:
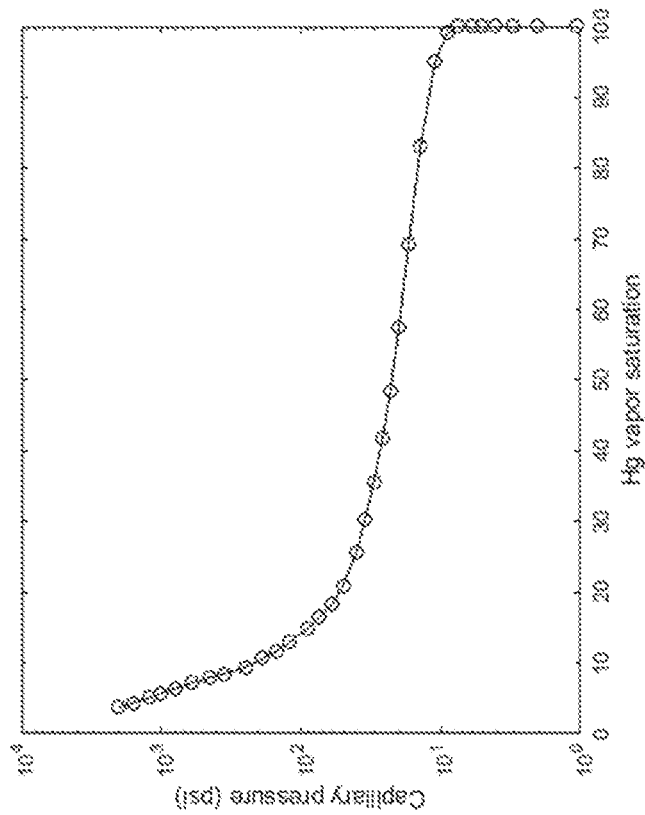
FIG. 9A illustrates a mercury intrusion curve in accordance with embodiments of various techniques described herein.

An example of mercury porosimetry data on a core (e.g., a typical mercury intrusion curve) is shown in FIG. 9A. With increasing pressure, mercury (Hg) is forced into the core resulting in monotonically decreasing saturation of Hg vapor and increasing saturation of mercury. The Brooks-Corey model in Equation 2 may predict a power-law variation of capillary pressure with normalized Hg saturation in Equation 1. This power-law behavior of data in FIG. 9A is highlighted in FIG. 9B with a fit of Equation 2 (e.g., a modified Brooks Corey model) to the data (e.g., as shown by the dashed line in FIG. 9B) and provides a $\lambda$=1.55 and $P_{ce}$=10 psi.

Figure 10B:
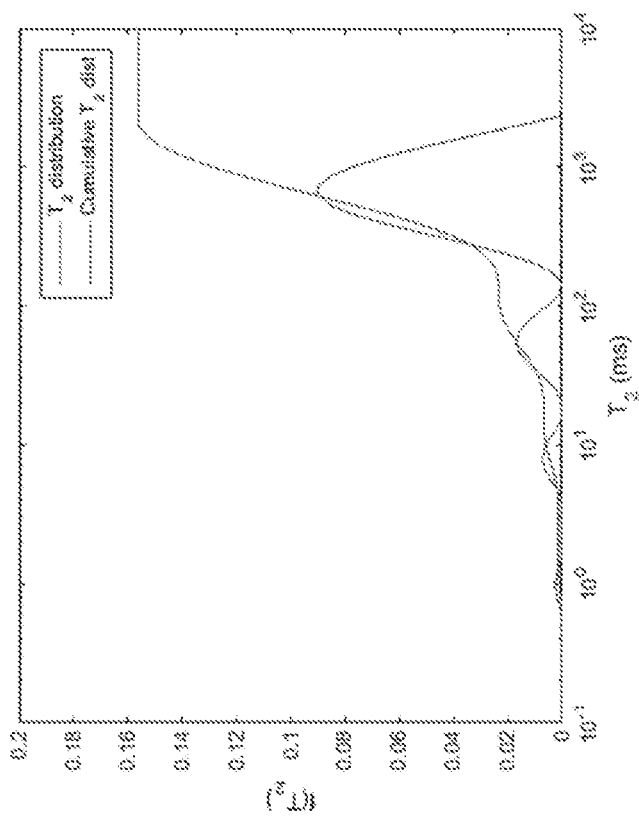
FIG. 10A illustrates a $T_2$ distribution (blue) and its cumulative (red) for the core of FIG. 9A in accordance with embodiments of various techniques described herein and FIG. 10B illustrates a cumulative T2 distribution to capillary pressure and fit with Brooks-Corey model.
Figure 10A:
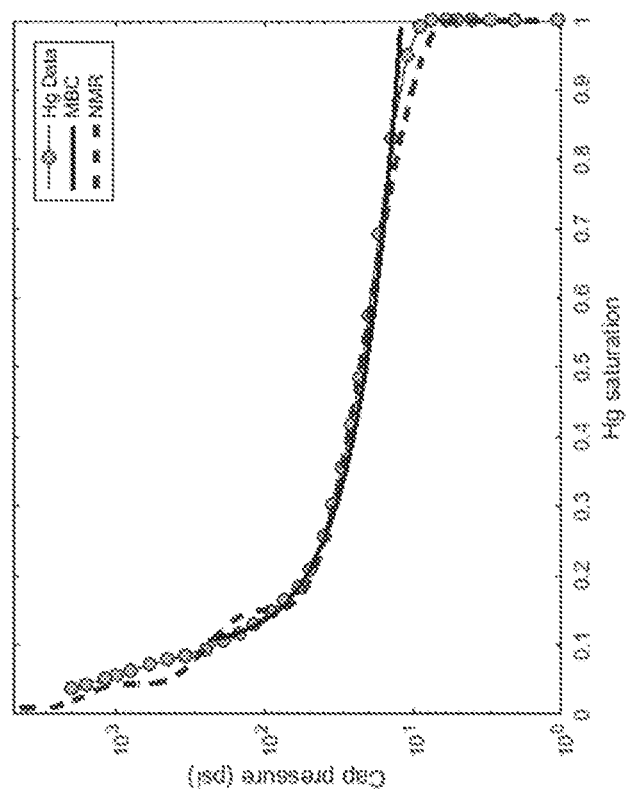

In one implementation, the NMR $T_2$ and its cumulative distribution for this 100% brine-saturated core is shown in FIG. 10A. Under the assumption of a constant relaxivity and pore body-to-throat ratio, the cumulative distribution may have similar information to Hg data. A scaling factor $\kappa \triangleq P_c T_2$ may be used to convert the cumulative $T_2$ distribution to a capillary pressure curve. In the absence of core data, an universally accepted rule of thumb for cores is $\kappa$=3 psi-s. Converting the cumulative $T_2$ distribution to capillary pressure and fit with Brooks-Corey model is shown in FIG. 10B and may provide a very good fit to the Hg data with a $\lambda$=1.5. In some implementations, an optimal procedure for converting $T_2$ distribution to capillary pressure for a particular reservoir involves selecting core plugs, acquiring laboratory Hg and NMR measurements on 100% brine saturated cores, and then finding either "an optimal" $\kappa$ or a capillary-pressure dependent $\kappa$.

In some implementations, estimating $\lambda$ from NMR data from a partially oil/brine saturated core may be a more mathematically convoluted procedure and may require many assumptions. From analysis of the partially saturated data, a "best guess" $T_2$ distribution of the 100% brine saturated data may be obtained. This best guess may be based on observed correlation in cores between the bound fluid volume and the peak of the $T_2$ distribution of free water. A synthetic 100% brine saturated $T_2$ distribution is obtained by applying a correction to the drainage $T_2$ distribution. This correction attempts to remove the $T_2$ distribution of the hydrocarbon and adds in the best-guess $T_2$ distribution of the free water. This method may strongly rely on being able to guess the $T_2$ distribution of oil and water.

In some embodiments, Kr-Pc feasible region reduction process 10 may estimate 202 a pore size distribution index based upon, at least in part, nuclear magnetic resonance (NMR) data from the downhole logging data of the porous media. In some implementations, Kr-Pc feasible region reduction process 10 may estimate 202$\lambda$ from 100% brine saturated rock and partially oil/brine saturated rock. In some implementations, Kr-Pc feasible region reduction process 10 may not require that the scaling factor $\kappa$ be known or the reconstruction of a best guess $T_2$ distribution based on an expected correlation between bound water and free water. In some embodiments and as will be discussed in greater detail below, Kr-Pc feasible region reduction process 10 may obtain a feasible set of solutions for Kr-Pc from inversion of resistivity and formation testing data.

As discussed above, without prior information about $\kappa$, Kr-Pc feasible region reduction process 10 may estimate 202 the parameter $\lambda$ for 100% brine saturated data. For example, the pressure at which a non-wetting fluid enters a pore may be determined by $$P_c = \frac{2\sigma \cos(\theta)}{r_t}. \tag{5}$$

Here, $\sigma$ is the interfacial surface tension of the fluid and $\theta$ is the contact angle the fluid interface and pore wall and $r_t$ is the largest radius of the throat connecting to the pore. In the field of NMR, the relaxation is sensitive to pore body $r_b$ (defined as the pore volume to surface area), as shown in Equation 6:

$$\frac{1}{T_2} = \frac{k\rho}{r_b} + \frac{1}{T_{2,B}}. \quad (6)$$

Here, k is a function of pore-shape, $\rho$ is the relaxivity of the grain and $T_{2,B}$ is the bulk relaxation of the fluid, which is typically much larger than the surface relaxation of fluid in the porous medium. Therefore, for most practical purposes, $$\frac{1}{T_2} = \frac{k\rho}{r_b}. \quad (7)$$

In some implementations, Equations 5 and 7 may be combined as:

$$P_c = \frac{2\sigma\cos(\theta)}{r_b} \frac{r_b}{r_t} = \frac{2\sigma\cos(\theta)}{k\rho T_2} \frac{r_b}{r_t} \quad (8)$$

In some implementations, it may be assumed that the pore body to throat ratio may not vary appreciably with pore size. Therefore, $r_b/r_t$ may be an unknown constant for a rock although it may vary with facies or lithology.

From Equations 2 and 8, $$\log(T_2) = \frac{1}{\lambda}\log(S_w^*) + c, \quad (9)$$

where the constant c is a function of pore entry pressure $P_{ce}$ and unknown parameters: $\rho$, $r_b/r_t$, k, $\theta$ and $\sigma$.

Figure 11B:
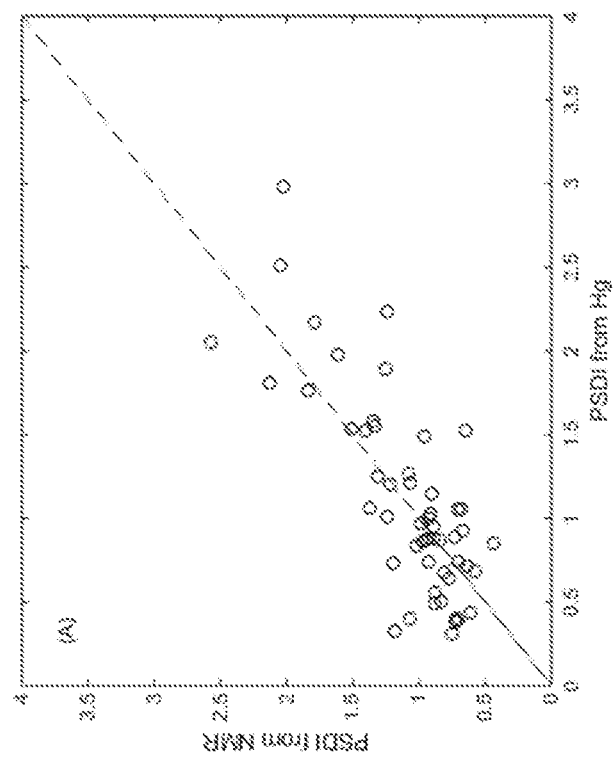
FIGS. 11A-11B illustrate a pore size distribution index from 100% brine saturated cores are compared with that obtained from mercury porosimetry data for carbonates in FIG. 11A and sandstones in FIG. 11B in accordance with embodiments of various techniques described herein.
Figure 11A:
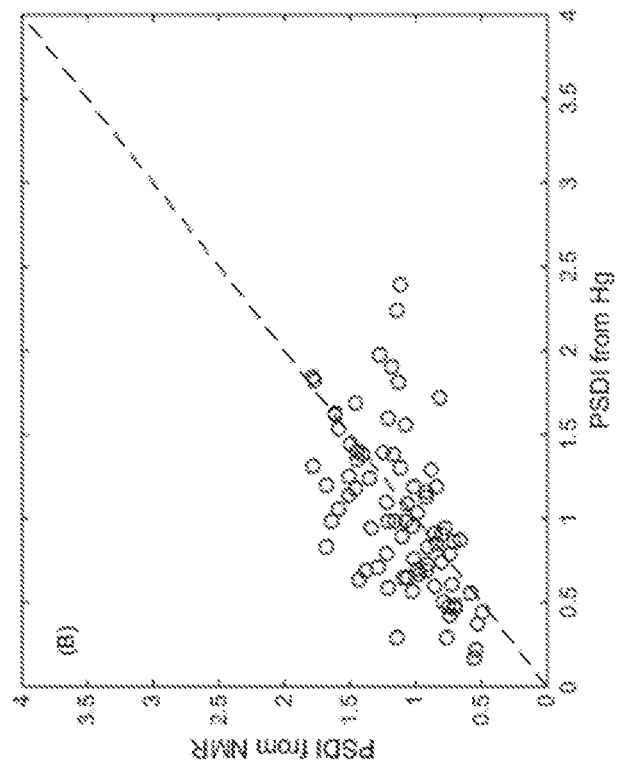

From Equation 9, under the assumption that the relaxivity does not vary appreciably with pore size, the slope of the cumulative $T_2$ distribution with normalized water saturation may directly provide $\lambda$. Note that the computation of $\lambda$ from Equation 9 does not require any knowledge of $\rho$, $r_b/r_t$, k, $\theta$ and/or $\sigma$ since they are only collectively present through the parameter c. FIGS. 11A-11B compare the $\lambda$ obtained from NMR and Hg data on a database of cores consisting of carbonates in FIG. 11A and sandstones in FIG. 11B. From this comparison, it may be observed that Kr-Pc feasible region reduction process 10 may estimate $\lambda$ from 100% brine-saturated data.

In some implementations, estimating 202 the pore size distribution index may include integrating 206 the NMR data, dielectric measurements, and resistivity measurements to estimate residual saturation for normalization in oil/brine partially saturated porous media. In some implementations, Kr-Pc feasible region reduction process 10 may integrate 206 NMR and dielectric and resistivity measurements to provide residual saturation and use them in Equation 1 for normalization in oil/brine partially saturated rocks. For example, Kr-Pc feasible region reduction process 10 may estimate 208 $\lambda$ or PSDI from water $T_2$ distribution on a fully or partially saturated rock (either in laboratory or downhole) without a priori information about relaxivity, pore-body to throat ratio. For example, in a logging environment, NMR tools may be sensitive to the flush zone which may have both water-based mud filtrate and residual oil. Therefore, Kr-Pc feasible region reduction process 10 may be able to estimate 208$\lambda$ from partially saturated rocks. As will be discussed in greater detail below, a logic similar to the above holds for partially brine/oil saturated rock as well. Recent NMR logging tools provide D–$T_2$ maps of the near well-bore region containing brine and oil. Different techniques known in the art including diffusion coefficient log mean (DCLM) or integration with dielectric measurements can be used to isolate the oil and water signatures and estimate the oil and water $T_2$ distributions. The oil $T_2$ distribution may be used to relate it to viscosity. In some implementations, the water $T_2$ distribution may be used to infer $\lambda$. For example, the primary property that defines $\lambda$ may be the width of the $T_2$ distribution. The exact shape of the distribution may play a secondary role. Therefore, as long as water is in most pores, irrespective of the volume of water, the cumulative $T_2$ distribution may be related to the normalized saturation and used by Kr-Pc feasible region reduction process 10 to estimate $\lambda$. In some implementations, Kr-Pc feasible region reduction process 10 may obtain the total water saturation in Equation 1 either from NMR or dielectric tools via Kr-Pc feasible region reduction process 10.

Figure 12:
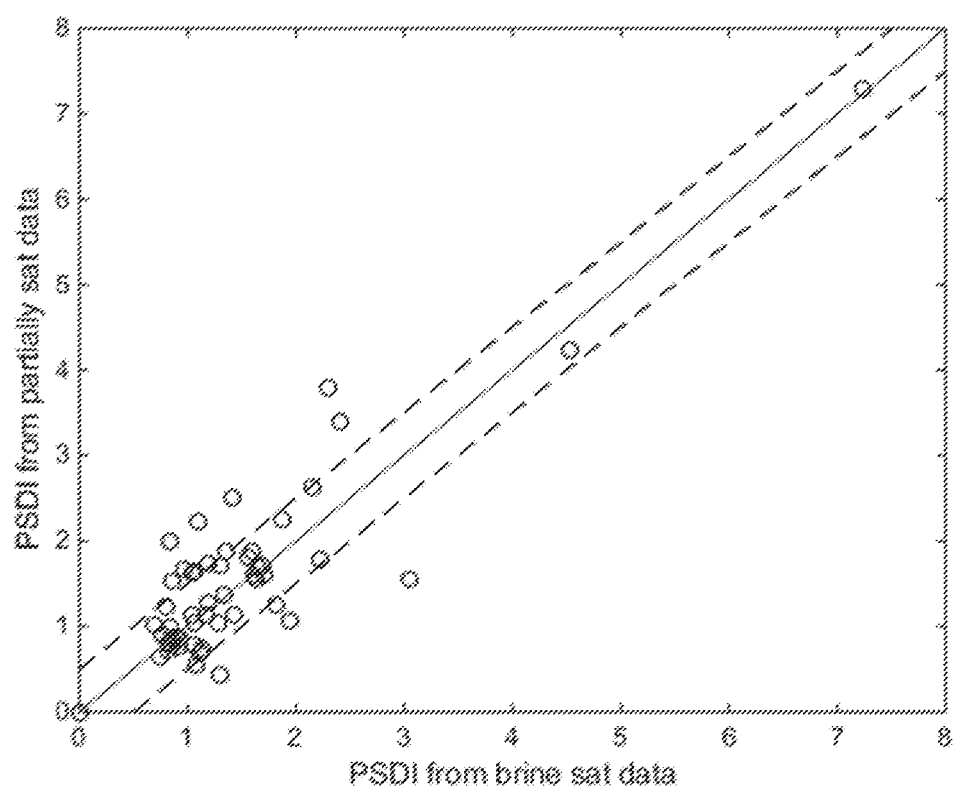
FIG. 12 illustrates a pore size distribution index from partially brine saturated cores in forced imbibition compared with that obtained from 100% brine saturated data in accordance with embodiments of various techniques described herein.

The feasibility of this embodiment of Kr-Pc feasible region reduction process 10 is shown in FIG. 12, where $\lambda$ estimated 202 from NMR on partial brine/oil saturated cores is compared in the laboratory with $\lambda$ from NMR on 100% brine saturated cores. The volume of brine saturation in these cores varied from 45-96%. The comparison again looks reasonable and it may be determined that $\lambda$ from partially saturated cores is estimated 202 reasonably well by Kr-Pc feasible region reduction process 10. Therefore, it is feasible to estimate 202$\lambda$ from the flush zone from NMR logging tools via Kr-Pc feasible region reduction process 10.

In some embodiments, Kr-Pc feasible region reduction process 10 may generate 204 a relative permeability and capillary pressure curve with a reduced feasible region of solutions based upon, at least in part, the pore size distribution index. For example, from the estimated $\lambda$ and assuming a water-wet rock or porous media, water and/or oil relative permeabilities may be estimated or computed by Kr-Pc feasible region reduction process 10 (e.g., from modified Brooks-Corey or similar models). In some implementations, generating 204 the Kr-PC curve based upon, at least in part, the pore size distribution index may include interpretation/inversion of array-resistivity and formation testing and sampling data. For example, and as will be discussed in greater detail below, dielectric and/or flow-line NMR modules can provide information about wettability can further help reduce the set of feasible solutions of Kr-Pc and thereby better condition the problem. In some implementations, combining dielectric and NMR and resistivity measurements may help confine the saturation endpoints for Kr-Pc curves. Further, if core mercury porosimetry data is available, Kr-Pc feasible region reduction process 10 may generate a feasible solution space for hysteresis of both drainage and imbibition relative permeability curves.

Figure 13:
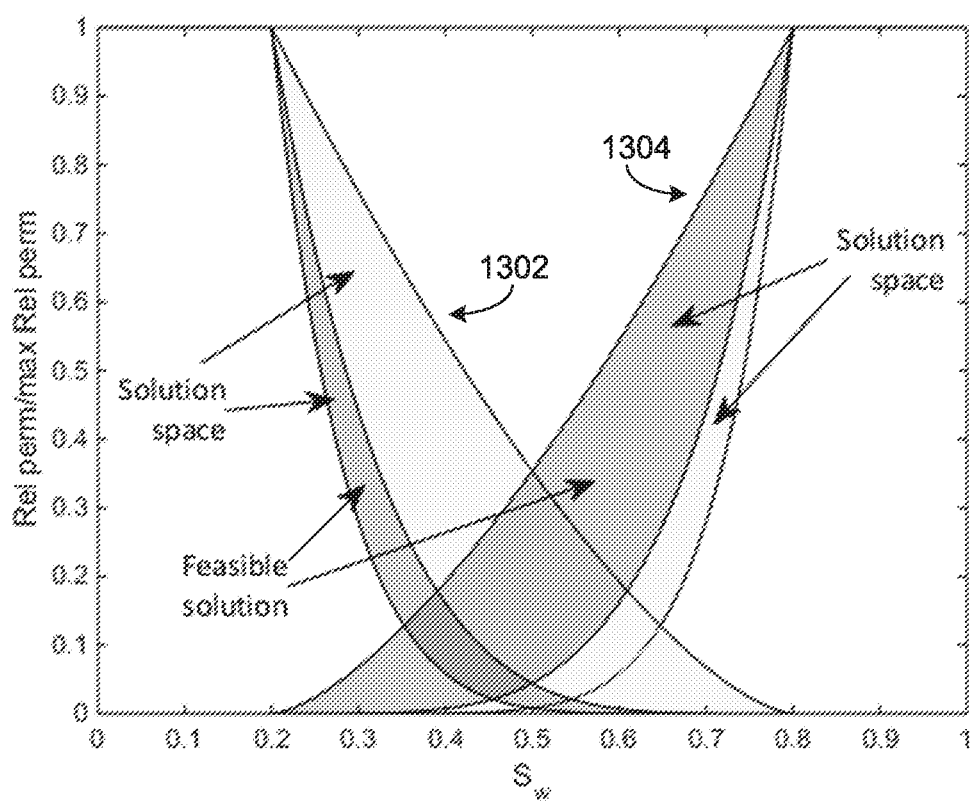
FIG. 13 illustrates $(k_{rw}/k_{rw,max})$ and $(k_{ro}/k_{ro,max})$ as a function of water saturation $S_w$. The entire curve is the set of all feasible solutions that fit the measured formation tester and resistivity data in accordance with embodiments of various techniques described herein.

In some implementations, generating 204 the relative permeability and capillary pressure curve may include defining 210 one or more of an upper bound on an oil relative permeability of the relative permeability and capillary pressure curve and a lower bound on a water relative permeability of the relative permeability and capillary pressure curve based upon, at least in part, a modified Brooks-Corey model. As discussed above, because Kr-Pc feasible region reduction process 10 may estimate 202$\lambda$ from NMR, the relative permeability of oil and water for a water-wet rock may be computed from several models. For example, Kr-Pc feasible region reduction process 10 may use the modified Brooks-Corey model with $n_w=3+2/\lambda$ and $n_o=1+2/\lambda$ in Equations 1~4 to reduce 212 the feasible solutions of the Kr-Pc curves by defining an upper bound on the relative permeability of oil ($n_o$) and a lower bound on the relative permeability of water ($n_w$). From FIG. 7, the relative oil permeability is largest and relative water permeability is the smallest for a water-wet scenario with a specific pore size distribution. Therefore, these relative permeability curves may provide an upper and lower bound on the feasible region for oil and water relative permeabilities ($n_o$ 1302 and $n_w$ 1304) as shown in FIG. 13. In FIG. 13, ($k_{rw}/k_{rw,max}$) and ($k_{ro}/k_{ro,max}$) are shown as a function of water saturation $S_w$. The entire curve may represent the set of all solutions that fit the measured formation tester and resistivity data. For example, in FIG. 13, the entire curve (e.g., shaded and unshaded areas of the Kr-Pc curve) may represent the entire solution space for the relative permeability and capillary pressure of a reservoir and the shaded areas may define the feasible solution for the relative permeability and capillary pressure of the reservoir based upon, at least in part, the pore size distribution index and/or the upper and lower bound on the feasible region for oil and water relative permeabilities.

In some implementations, generating 204 the relative permeability and capillary pressure curve may include integrating 214 log NMR data with flow-line NMR to estimate wettability. For example, Kr-Pc feasible region reduction process 10 may determine or compute the wettability index by integrating 214 measurements from a flow-line NMR tool (to measure bulk fluid properties) and a logging NMR tool (to measure fluid properties in the porous medium).

In some implementations, Kr-Pc feasible region reduction process 10 may estimate 216 one or more Corey exponents for a curvature of one or more of an oil relative permeability curve and a water relative permeability curve based upon, at least in part, the wettability estimate. For example, Kr-Pc feasible region reduction process 10 may utilize Corey exponents $n_w=3+2/\lambda$ and $n_o=1+2/\lambda$ in Equations 1-4. When the core is mixed-wet, the relative permeability of oil may be lower and that for water may be higher than predicted from these curves. In another embodiment, estimating $202\lambda$ from NMR data via Kr-Pc feasible region reduction process 10 may be combined with a wettability index derived either from dielectric logging data and/or from integration of wireline/LWD logging NMR tool (to measure fluid properties in the porous medium) and a flow-line NMR tool (to measure bulk fluid properties).

In some implementations, Kr-Pc feasible region reduction process 10 may reduce 218 a feasible region of solutions of the relative permeability and capillary pressure curve based upon, at least in part, the one or more Corey exponents. For example, Kr-Pc feasible region reduction process 10 may use end-point saturations as well as cementation and saturation exponents from dielectric tool (e.g., a dielectric scanner) to further reduce the space of feasible solutions in the relative permeability and capillary pressure curve. One method of doing this is for Kr-Pc feasible region reduction process 10 to relate the wettability index to a range of feasible $n_w$ and $n_o$.

In some implementations, generating 204 the relative permeability and capillary pressure curve may include estimating 220 relative permeability hysteresis from one or more of NMR and mercury porosimetry core data. For example, where Kr-Pc feasible region reduction process 10 may receive mercury (Hg) porosimetry data from a core (e.g., from the downhole logging), it may be possible to characterize or estimate 220 relative permeability hysteresis. Since Hg is a non-wetting fluid, porosimetry can provide information about drainage Kr-Pc, whereas downhole NMR data in a water-wet formation provides information about imbibition Kr-Pc. It is often assumed that they are the same. However, if both NMR and porosimetry data are available, Kr-Pc feasible region reduction process 10 may better predict reservoir behavior based upon, at least in part, relative permeability hysteresis from the NMR and Hg porosimetry core data. For example, if core mercury porosimetry data is available, Kr-Pc feasible region reduction process 10 may reduce 222 the feasible region of solutions for hysteresis of both drainage and imbibition relative permeability curves. In this manner, the feasible region of solutions may be narrowed down because the ranges of parameters of the Kr-Pc curve may be confined from the NMR interpretation (e.g., pore size distribution index) and/or estimation of wettability status.

In some implementations, Kr-Pc feasible region reduction process 10 may invert for Kr-Pc from the array-resistivity logs and formation testing and sampling data. Due to the "non-uniqueness" nature of the problem, Kr-Pc feasible region reduction process 10 may end up with many possible Kr-Pc curves fitting the measurements equally well. With a reduced feasible solution space as discussed above, Kr-Pc feasible region reduction process 10 may narrow down the possible solutions for the relative permeability and capillary pressure of a reservoir. In some implementations, those solutions fitting the measurements and dropping into the feasible solution space will be used for reservoir modeling.

Figure 14:
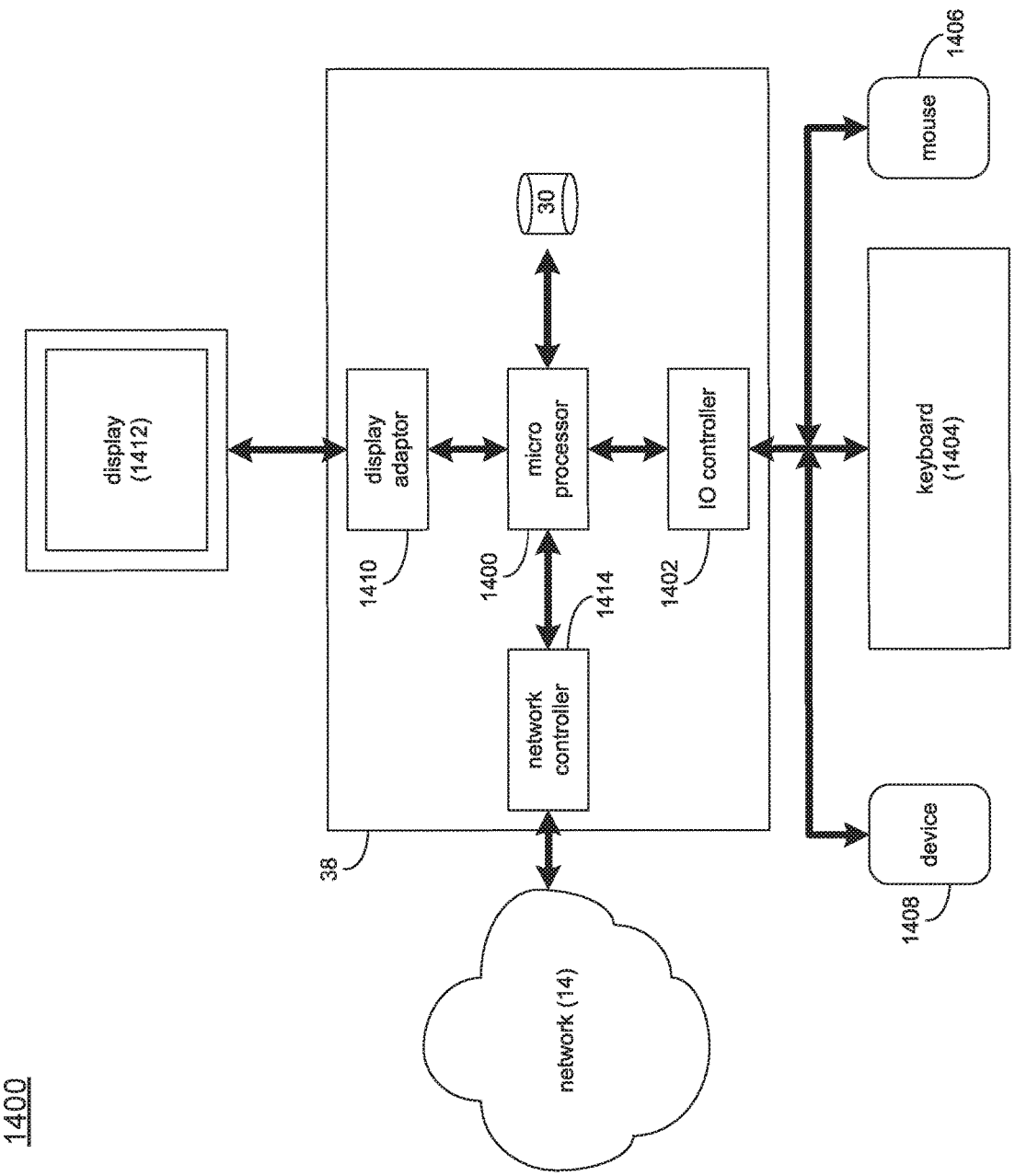
FIG. 14 is an example diagrammatic view of a client electronic device of FIG. 1 according to one or more example implementations of the disclosure.

Referring also to FIG. 14, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, webpage component replication process 10 may be substituted for client electronic device 38 within FIG. 14, examples of which may include but are not limited to computing device 12 and/or client electronic devices 40, 42, 44.

Client electronic device 38 may include a processor and/or microprocessor (e.g., microprocessor 1400) configured to, e.g., process data and execute the above-noted code/instruction sets and subroutines. Microprocessor 1400 may be coupled via a storage adaptor (not shown) to the above-noted storage device(s) (e.g., storage device 30). An I/O controller (e.g., I/O controller 1402) may be configured to couple microprocessor 1400 with various devices, such as keyboard 1404, pointing/selecting device (e.g., mouse 1406), custom device, such a microphone (e.g., device 1408), USB ports (not shown), and printer ports (not shown). A display adaptor (e.g., display adaptor 1410) may be configured to couple display 1412 (e.g., CRT or LCD monitor(s)) with microprocessor 1400, while network controller/adaptor 1414 (e.g., an Ethernet adaptor) may be configured to couple microprocessor 13400 to the above-noted network 14 (e.g., the Internet or a local area network).

The flowchart and block diagrams in the figures illustrate the architecture, functionality, and operation of possible implementations of systems and methods and according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As used in any embodiment described herein, the term "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment or embodiment herein may be implemented in software, firmware, hardwired circuitry and/or any combination thereof.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A method for reducing a feasible region of solutions of a relative permeability and capillary pressure curve, comprising:
    deploying a logging device into a well;
    obtaining downhole logging data for a porous media with the logging device in the well;
    transferring the downhole logging data of the porous media to a computing device;
    estimating a pore size distribution index based upon, at least in part, nuclear magnetic resonance data (NMR) from the downhole logging data of the porous media; and
    generating a relative permeability and capillary pressure curve with a feasible region of solutions based upon, at least in part, the pore size distribution index, wherein the pore size distribution index is estimated by inversion of array-resistivity and formation testing and sampling data.

2. The method of claim 1, wherein estimating the pore size distribution index includes estimating the pore size distribution index on one or more of a fully-saturated and a partially-saturated porous media.

3. The method of claim 1, wherein estimating the pore size distribution index includes integrating the NMR data, dielectric measurements, and resistivity measurements to estimate residual saturation for normalization in oil/brine partially saturated porous media.

4. The method of claim 1, wherein generating the relative permeability and capillary pressure curve includes defining one or more of an upper bound on an oil relative permeability of the relative permeability and capillary pressure curve and a lower bound on a water relative permeability of the relative permeability and capillary pressure curve based upon, at least in part, a modified Brooks-Corey model.

5. The method of claim 4, further comprising:
    reducing the feasible region of solutions of the relative permeability and capillary pressure curve based upon, at least in part, one or more of the upper bound on an oil relative permeability and the lower bound on a water relative permeability.

6. The method of claim 1, wherein generating the relative permeability and capillary pressure curve includes:
    integrating log NMR data with flow-line NMR to estimate wettability;
    estimating one or more Corey exponents for a curvature of one or more of an oil relative permeability curve and a water relative permeability curve based upon, at least in part, the wettability estimate; and
    reducing the feasible region of solutions of the relative permeability and capillary pressure curve based upon, at least in part, the one or more Corey exponents.

7. The method of claim 1, wherein generating the relative permeability and capillary pressure curve includes:
    estimating relative permeability hysteresis from one or more of NMR and mercury porosimetry core data; and
    reducing the feasible region of solutions of the relative permeability and capillary pressure curve based upon, at least in part, the relative permeability hysteresis.

8. A system, comprising:
    a logging device configured to be deployed into a well to obtain downhole logging data for a porous media within the well, and to transfer the downhole logging data to a computer system, wherein the computer system comprises:
a processor and memory configured to perform operations comprising:
receiving the downhole logging data for the porous media from the logging device;
estimating a pore size distribution index based upon, at least in part, nuclear magnetic resonance data (NMR) from the downhole logging data of the porous media; and
generating a relative permeability and capillary pressure curve with a feasible region of solutions based upon, at least in part, the pore size distribution index, wherein the pore size distribution index is estimated by inversion of array-resistivity and formation testing and sampling data.

9. The system of claim 8, wherein estimating the pore size distribution index includes estimating the pore size distribution index on one or more of a fully-saturated and a partially-saturated porous media.

10. The system of claim 8, wherein generating the relative permeability and capillary pressure curve includes defining one or more of an upper bound on an oil relative permeability of the relative permeability and capillary pressure curve and a lower bound on a water relative permeability of the relative permeability and capillary pressure curve based upon, at least in part, a modified Brooks-Corey model, and wherein the feasible region of solutions of the relative permeability and capillary pressure curve is determined based upon, at least in part, one or more of the upper bound on the oil relative permeability and the lower bound on the water relative permeability.

11. The system of claim 8, wherein generating the relative permeability and capillary pressure curve includes:
integrating log NMR data with flow-line NMR to estimate wettability;
estimating one or more Corey exponents for a curvature of one or more of an oil relative permeability curve and a water relative permeability curve based upon, at least in part, the wettability estimate; and
reducing the feasible region of solutions of the relative permeability and capillary pressure curve based upon, at least in part, the one or more Corey exponents.

12. The system of claim 8, wherein generating the relative permeability and capillary pressure curve includes:
estimating relative permeability hysteresis from one or more of NMR and mercury porosimetry core data; and
reducing the feasible region of solutions of the relative permeability and capillary pressure curve based upon, at least in part, the relative permeability hysteresis.

13. The method of claim 1, further comprising determining how the well should be completed based upon, at least in part, the relative permeability and capillary pressure curve.

14. The method of claim 1, further comprising planning development of an oilfield the well is located within based upon, at least in part, the relative permeability and capillary pressure curve.

15. The method of claim 1, further comprising modeling a reservoir the well is located in based upon, at least in part, the relative permeability and capillary pressure curve.

16. The method of claim 1, further comprising predicting fluid production from a reservoir the well is located within based upon, at least in part, the relative permeability and capillary pressure curve.

17. The method of claim 1, further comprising outputting the generated relative permeability and capillary pressure curve by displaying the generated relative permeability and capillary pressure curve in a graphical form on a display.

18. The method of claim 4, wherein the modified Brooks-Corey model utilizes equations (1) to (4):

$$S_w^* = \left( \frac{s_w - s_{w,irr}}{1 - s_{w,irr} - s_{or}} \right) \quad (1)$$

$$P_c = P_{ce}(S_w^*)^{-1/\lambda} \quad (2)$$

$$k_{rw} = k_{rw,max}(S_w^*)^{n_w} \quad (3)$$

$$k_{ro} = k_{ro,max}(1 - S_w^*)^{n_o}, \quad (4)$$

wherein $S_w^*$ defines the normalized wetting-phase saturation, $S_w$ defines the residual saturation of the wetting phase, $S_{w,irr}$ is the irreducible water, $S_{or}$ is the irreducible oil, $P_c$ is the capillary pressure, $P_{ce}$ is the capillary entry pressure, $\lambda$ is the pore size distribution index, $k_{rw}$ is the relative permeability for water, is the relative permeability end-point for water, $n_w$ is the curvature of the water relative permeability curve, $k_{ro}$ is the relative permeability for oil, $k_{ro,max}$ is the relative permeability end-point for oil, and $n_o$ is the curvature of the oil relative permeability curve.

19. The method of claim 1, wherein the entire relative permeability and capillary pressure curve represents a set of all solutions that fit fractional flow data, transient pressure data, and resistivity data from the downhole logging data of the porous media.

20. The system of claim 8, wherein the processor is further configured to output the generated relative permeability and capillary pressure curve to a display such that the generated relative permeability and capillary pressure curve is displayed in a graphical form on the display.

* * * * *